(12) United States Patent
Begen (10) Patent No.: US 8,027,935 B1
(45) Date of Patent: Sep. 27, 2011

(54) SYSTEMS AND METHODS FOR VALUE BEARING INDICIA BALANCE RESERVATION

(75) Inventor: Geoffrey Charles Begen, Lake Forest, CA (US)

(73) Assignee: Stamps.com Inc, Los Angeles, CA (US)

( * ) Notice: Subject to any disclaimer, the term of this patent is extended or adjusted under 35 U.S.C. 154(b) by 552 days.

(21) Appl. No.: 11/970,933

(22) Filed: Jan. 8, 2008

(51) Int. Cl.
*G06F 17/00* (2006.01)

(52) U.S. Cl. .......................................... 705/401

(58) Field of Classification Search .................. None
See application file for complete search history.

(56) References Cited

U.S. PATENT DOCUMENTS

| | | | |
|---|---|---|---|
| 4,807,139 A * | 2/1989 | Liechti | 705/403 |
| 5,010,485 A * | 4/1991 | Bigari | 705/17 |
| 5,822,739 A | 10/1998 | Kara | |
| 6,385,731 B2 * | 5/2002 | Ananda | 726/6 |
| 6,424,954 B1 * | 7/2002 | Leon | 705/401 |
| 6,889,214 B1 | 5/2005 | Pagel et al. | |
| 7,149,726 B1 | 12/2006 | Lingle et al. | |
| 7,177,825 B1 | 2/2007 | Borders et al. | |
| 7,233,929 B1 | 6/2007 | Lingle et al. | |
| 7,243,842 B1 | 7/2007 | Leon et al. | |
| 2006/0213979 A1 * | 9/2006 | Geller et al. | 235/380 |
| 2006/0213980 A1 * | 9/2006 | Geller et al. | 235/380 |
| 2008/0103968 A1 * | 5/2008 | Bies et al. | 705/39 |
| 2009/0172126 A1 * | 7/2009 | Brennan et al. | 709/217 |

OTHER PUBLICATIONS

"Pitney Bowes Licenses the Certicom Elliptic Curve Engine to Secure Postal Metering Application; Unqiue Secure Electronic Commerce Application Meets Special Needs of Small Office/Home Office.", Business Wire, Sep. 23, 1997.*

* cited by examiner

*Primary Examiner* — Rutao Wu
(74) *Attorney, Agent, or Firm* — Fulbright & Jaworski L.L.P.

(57) ABSTRACT

Systems and methods which operate to reserve an amount of value associated with a value bearing indicia (VBI) request or requests are shown. Embodiments facilitate completion of a multiple VBI session without failing due to insufficient value balance once the session has begun. Additionally or alternatively, embodiments facilitate later or subsequent (e.g., scheduled) completion of a VBI session, whether a session for a single VBI or multiple VBI, without failing due to insufficient value balance. Value reservations may be made automatically and/or manually. Embodiments provide various reservation priority levels, such as to individual users, user groups, user systems, sessions, types of sessions, jobs, etc., in order to facilitate completion of various desired operations without failure due to insufficient value. Value reservation techniques according to embodiments do not introduce additional transactions into a normal VBI session flow.

23 Claims, 2 Drawing Sheets

SYSTEMS AND METHODS FOR VALUE BEARING INDICIA BALANCE RESERVATION

CROSS-REFERENCE TO RELATED APPLICATIONS

The present application is related to co-pending and commonly assigned U.S. patent application Ser. No. 10/862,058 entitled "Virtual Security Device," filed Jun. 4, 2004, the disclosure of which is hereby incorporated herein by reference.

TECHNICAL FIELD

The invention relates generally to issuance of value bearing indicia and, more particularly, to reservation of value bearing indicia balances.

BACKGROUND OF THE INVENTION

Metering of value bearing indicia (VBI) in the form of postage indicia has been widely utilized for a number of years. In traditional scenarios, a postage metering apparatus was provided with a balance of postal value, originally stored in a mechanical vault and later stored in an electronic vault, for use in issuing individual postage meter stamps. Individual users could access the metering device to operate the device for issuing one or more postage meter stamps, provided sufficient postal value was available.

In more recent years, computer-based postage metering platforms have been provided. For example, the systems of U.S. Pat. Nos. 5,822,739 entitled "System and Method for Remote Postage Metering," 6,889,214 entitled "Virtual Security Device," 7149,726 entitled "Online Value Bearing Item Printing," 7,233,929 entitled "Postal System Intranet and Commerce Processing for On-Line Value Bearing System," and 7,243,842 entitled "Computer-Based Value-Bearing Item Customization Security," the disclosures of which are incorporated herein by reference, disclose various computer-based platforms suitable for providing postage metering operation. Such systems have facilitated more widespread use and availability of postage metering systems. Moreover, such computer-based platforms have introduced features previously unavailable with the traditional postage metering systems.

For example, computer-based postage metering platforms have facilitated simultaneous or substantially simultaneous (i.e., appearing from the user's perspective to be simultaneous) access to a postage metering system by multiple users. As shown in the above referenced patent entitled "System and Method for Remote Postage Metering," as but one example, network infrastructure provides multiple users with access to a same postage meter server. Accordingly, a single postage value balance may be shared by each such user. This configuration has been particularly well received in the business enterprise environment, wherein a plurality of employees of the enterprise require access to a postage value balance. Such user access may include users obtaining a single postage indicium or users obtaining a plurality of postage indicia. Batch processing of value requests is shown, for example, in the above referenced patent entitled "Computer-Based Value-Bearing Item Customization Security."

BRIEF SUMMARY OF THE INVENTION

The present invention is directed to systems and methods which operate to reserve an amount of value associated with a value bearing indicia (VBI) request or requests. Embodiments of the invention facilitate completion of a multiple VBI session without failing due to insufficient value balance once the session has begun using value reservation techniques. Additionally or alternatively, embodiments of the invention facilitate later or subsequent (e.g., scheduled) completion of a VBI session, whether a session for a single VBI or multiple VBI, without failing due to insufficient value balance using value reservation techniques.

Value reservations implemented according to embodiments of the invention may be made automatically and/or manually. For example, where a user begins a session for generating multiple VBI, such as where the user is processing a batch of mail for application of information based indicia (IBI) using a computer-based postage metering system, a reservation of an amount of postage sufficient to generate all of the VBI is preferably automatically made (i.e., without an express request for reservation by the user) prior to beginning generation of any of the VBI. Where a user intends to generate one or more VBI at a later time, but wishes to ensure that sufficient value is available to the user for the generation of the VBI, the user may manually (i.e., by making an express request for reservation of value) make a value reservation according to an embodiment of the invention.

If sufficient value is not available at the initiation of a session, or upon an attempt to reserve value, embodiments of the invention alert an associated user and/or prevent the session from proceeding. Similarly, if sufficient value is not available, considering the current value balance and all active value reservations, at the initiation of a session, or upon an attempt to reserve value, embodiments of the invention alert an associated user and/or prevent the session from proceeding. Such embodiments avoid a situation where a session is begun which cannot be completed due to insufficient value.

Embodiments of the invention may operate to give a user, such as when notified of insufficient value for a session as described above, options other than preventing the session from proceeding. For example, the user may be given the option to purchase or otherwise acquire more value, preferably making a reservation of the otherwise available partial value during a time in which the user is obtaining the additional value. Additionally or alternatively, the user may be given the option to complete as much of the session as is possible using the available value. For example, the user may "redefine" the session to conform to the available value, preferably making a reservation of the otherwise available partial value during a time in which the user has the option of redefining the session.

Embodiments of the invention provide various reservation priority levels, such as to individual users, user groups, user systems, sessions, types of sessions, jobs, etc., in order to facilitate completion of various desired operations without failure due to insufficient value. These priority levels may be utilized with respect to various value reservations, such as to cancel or override lower priority value reservations for subsequent sessions. Embodiments of the invention, however, preferably do not cancel or override a value reservation after a session has proceeded to the point of generating VBI, thereby ensuring that the session, once begun, does not fail for insufficient value. Of course, embodiments of the invention may operate to cancel or override lower priority value reservations, even once the session has begun, if desired.

Value reservation techniques implemented according to embodiments of the invention do not introduce additional transactions into a normal VBI session flow. Such embodiments result in minimal impact on communication bandwidth and/or server load as a result of introduction of value reservation techniques. Embodiments adapted to minimize impact upon communication bandwidth and server load may, however, introduce additional transactions in an other than normal VBI session flow. For example, where an operator prematurely terminates a VBI session, embodiments of the invention may utilize a separate transaction to release a previously made value reservation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
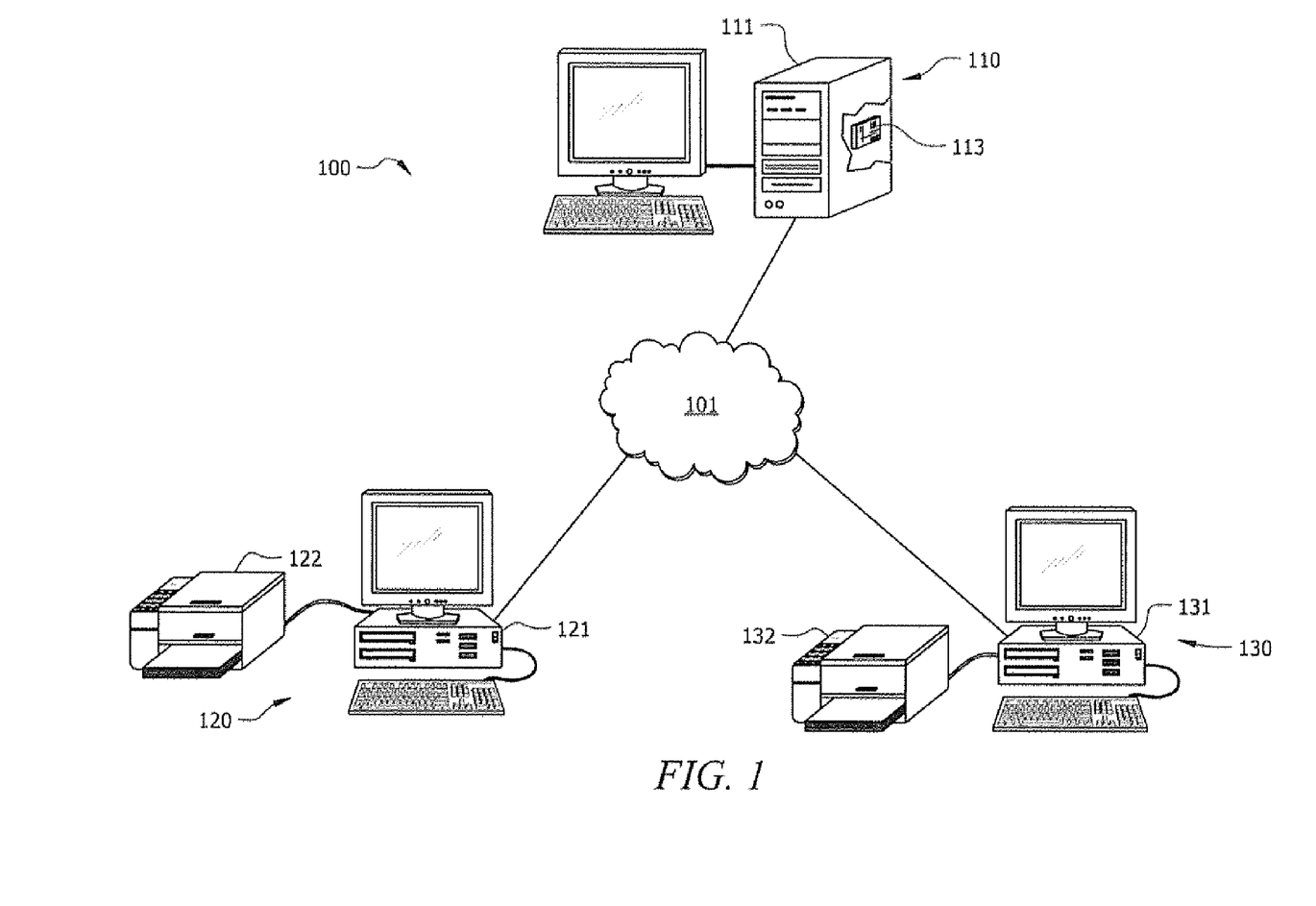
FIG. 1 shows a system adapted to provide value reservation according to embodiments of the invention.

Directing attention to FIG. 1, a multi-user value bearing indicia (VBI) transaction system adapted to provide value reservation according to embodiments of the invention is shown as system 100. System 100 of the illustrated embodiment comprises server system 110 in communication with client systems 120 and 130 through network 101. Various VBI transaction systems as may be adapted to provide value reservation as described herein are shown in the above referenced patent application entitled "Virtual Security Device."

Network 101 provides information communication between server system 110 and client systems 120 and 130 such that multiple users operating respective ones of client systems 120 and 130 may access and obtain VBI from server system 110. Accordingly, network 101 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

Server system 110 preferably comprises a processor-based system, such as a computer having a central processing unit (CPU), memory, and appropriate input/output (I/O) devices and interfaces, operable under control of an instruction set defining operation as described herein. For example, server system 110 may comprise server platform 111 having a processor from the PENTIUM family of processors available from Intel Corporation, Santa Clara, Calif. Server system 110 provides secure storage and access to one or more value balance, such as may comprise postage value. Accordingly, server system 110 of the illustrated embodiment comprises vault 113, such as may comprise a 4758 PCI cryptographic coprocessor available from International Business Machines Corporation, Boca Raton, Fla., or other secure electronic memory module.

Client systems 120 and 130 preferably comprise processor-based systems, such as computers having a CPU, memory, and appropriate I/O devices and interfaces, operable under control of instruction sets defining operation as described herein. For example, client systems 120 and 130 may comprise computer platforms 121 and 131, respectively, having a processor from the PENTIUM family of processors available from Intel Corporation, Santa Clara, Calif. Client systems 120 and 130 preferably provide output of VBI obtained according to embodiments of the invention. Accordingly, the illustrated embodiments of client systems 120 and 130 include printers 122 and 132, respectively, for printing VBI, such as in the form of postage indicia (e.g., information based indicia (IBI)). Of course, other forms of output of VBI may be utilized according to embodiments of the invention, such as in the form of data packets as may be used in conducting electronic commerce.

Embodiments of the present invention will be described herein with reference to VBI in the form of postage value and the generation of postage indicia in order to provide examples for facilitating an understanding of the concepts of the present invention. However, it should be appreciated that the present invention is not limited to applicability with respect to postage or postage value.

Multi-user system 100 facilitates simultaneous or substantially simultaneous (i.e., appearing from the user's perspective to be simultaneous) access to server system 110 by multiple users (e.g., users of client systems 120 and 130). Accordingly, a single value balance stored by fault 113 may be shared by each such user. However, such multi-user access has been found by the present inventor to potentially lead to conflicts which result in sessions to transfer VBI failing due to insufficient availability of value.

For example, users of each of client systems 120 and 130 may logon, or otherwise initiate operation, with respect to server system 110, thereby giving each user an available value balance in this example, it is assumed that each such user is sharing a same value balance, although server system 110 of embodiments may host multiple separate value balances. As an example, ten dollars ($10.00) may be available for use with respect to a particular value balance account hosted by server system 110. As users at each of client systems 120 and 130 logon, they may be presented with information showing that the particular account value balance available for their use contains $10.00.

If each such user were to simultaneously attempt sessions to access the value balance of this account, either or both such users may be prevented from completing their respective sessions. For example, in the foregoing multi-user situation each user has their own client system with their own copy of the current value balance. As each such user attempts initiate a session for generating multiple VBI (e.g., each user desires to generate 2 priority mail postage indicia having a value of $4.60 each), the users may each individually determine that the value balance ($10,00) is sufficient for their session ($9.20 for each user). However, the value balance ($10.00) may be insufficient to complete both such sessions ($9.20+$9.20=$18.40).

In typical operation, although a session may be to provide multiple VBI, each such VBI is generated serially, using a series of transactions between the server and client systems. Accordingly, in the foregoing example, a user of client system 120 may attempt to initiate a session for the generation of 2 priority mail postage indicia having a value of $4.60 each, believing that a sufficient value balance is available. The client/server transactions for generation of this user's first such postage indicia may thereafter complete, resulting in a remaining value balance of $5.40 ($10.00−$4.60=$5.40). However, substantially simultaneously with the user of client system 120 attempting to initiating the foregoing session, a user of client system 130 may also attempt to initiate a session for the generation of 2 priority mail postage indicia having a value of $4.60 each, also believing that a sufficient value balance is available. The client/sever transactions for generation of this user's first such postage indicia may, mere fractions of a second behind the user of client system 120's transactions, thereafter complete, resulting in a remaining value balance of $0.80 ($5.40−$4.60=$0.80). The client server transactions for generation of the user of client system 120's second postage indicia may, mere fractions of a second behind the user of client system 130's transactions, thereafter fail due to insufficient value being available. Similarly, the client server transactions for generation of the user of client system 130's second postage indicia may also fail thereafter due to insufficient value being available.

As can be appreciated from the foregoing, multiple users may initiate sessions which exceed the current value balance, wherein none of the users know whether or not their sessions will succeed (i.e., proceed to completion). Accordingly, embodiments of the present invention operate to reserve an amount of value associated with a VBI request or requests. Embodiments of the invention thus facilitate completion of a multiple VBI session without failing due to insufficient value balance once the session has begun. Embodiments of the invention additionally or alternatively facilitate later or subsequent (e.g., scheduled) completion of a VIM session, whether a session for a single VBI or multiple VBI, without failing due to insufficient value balance using value reservation techniques.

Figure 2:
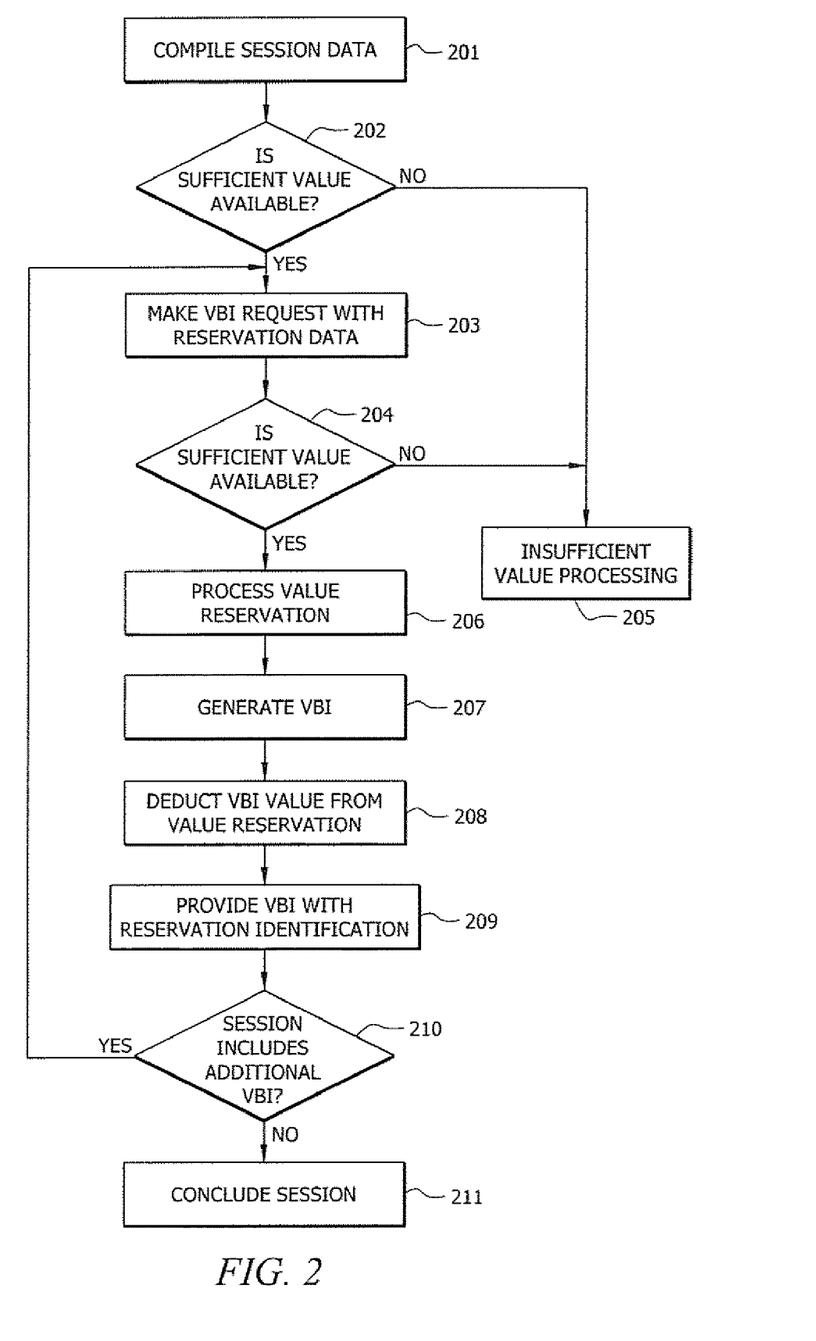
FIG. 2 shows a flow diagram of operation to provide value reservation according to embodiments of the invention.

Directing attention to FIG. 2, a high level flow diagram of value reservation techniques operable upon a multi-user system, such as system 100 of FIG. 1, is shown. In the flow diagram of FIG. 2, it is assumed that the user has already been properly authenticated and associated with an appropriate value account. For example, a user of client system 120 may have previously logged on with respect to server system 110 and been provided with a report of the balance of an account for which the user is authorized to access. As will be further discussed below, additional information useful according to embodiments of the invention, such as an amount of value already reserved for VBI sessions and/or an amount of value remaining unreserved, may additionally or alternatively be reported to the user, the client system, or both.

At box 201 of the illustrated embodiment, data regarding the desired VBI session is compiled. For example, client system 120 may operate to determine a number of postage indicia to be generated (e.g., 2 in the prior example) and the value of each postage indicia (e.g., $4.60 in the prior example) in order to determine a total amount of value needed to complete the desired session. It should be appreciated that the value of each postage indicia need not be the same. The user may input a number of VBI desired and the amount of the indicia. Likewise, the system may determine such information from operation thereof, such as in the case of batch processing of mail wherein the number of recipients are known and the mailing parameters (e.g., class, weight, size, delivery point, and/or the like) are known.

At box 202, a determination is made as to whether sufficient value is available for completing the desired session is made. For example, client system 120 may compare the total amount of value needed to complete the desired session (e.g., $9.20 in the above example) to the balance of the account the user is authorized to access (e.g., $10.00 in the above example) to determine if there is sufficient value in that account to complete the session. Additionally or alternatively, client system 120 may compare the total amount of value needed to complete the desired session to the value remaining unreserved in the account the user is authorized to access ($10.00−($R_1$+$R_2$+ . . . $R_N$), wherein $R_1$ through $R_N$ comprise the value reservations currently active with respect to the particular value account), where such information is available to client system 120.

If the foregoing determination (box 202) is that sufficient value is not available, processing according to the illustrated embodiment proceeds to box 205 wherein insufficient value processing is performed. Insufficient value processing according to embodiments of the invention may provide various operation. For example, insufficient value processing according to an embodiment may terminate the session initiation attempt and report to the user that insufficient value is available to complete the session, preferably providing additional information such as the amount of the deficit to aid the user in subsequent use of the system.

Insufficient value processing according to embodiments of the invention may operate to invoke additional processes, such as an account value refill operation. For example, where an insufficient amount of value is available, the user may be given the option to purchase or otherwise transfer additional value into the account. Upon completion of such additional processing, embodiments of the present invention may return to processing according to the illustrated flow diagram, such as to return to the determination of box 202.

Insufficient value processing according to embodiments of the invention operates to present the user with an option to continue the session as a partial session. For example, the user may be given the option to initiate the session such that only the number of VBI are generated that are possible using the value available in the account the user has accessed. Such an option may provide reporting to the user such that the user is informed of the number of VBI, and perhaps the particular VBI, which will successfully be generated so that the user is informed of that portion of the session which will not be performed. This option may further provide functionality to optimize the VBI generated, such as to maximize the number of VBI and/or the type of VBI (e.g., VBI having a higher class, priority, associated with particular end points, etc.) generated. For example, where VBI of different values are to be generated in a session, a higher value VBI may be omitted from the session where such an omission allows multiple other VBI to be generated, irrespective of where the omitted VBI originally fell in the order of VBI to be generated in the session. Where a user elects to continue the session as a partial session, processing according to embodiments of the present invention returns to processing according to the illustrated flow diagram, such as to proceed to box 203.

If it is determined that sufficient value is available to complete the session (box 202), processing according to the illustrated embodiments proceeds to box 203. At box 203 a request for VBI is made. It should be appreciated that such a request may be to obtain a complete VBI or may be to obtain data (e.g., a token of value) from which VBI may be generated. Keeping with the postage indicia example, the request may be for a digitally signed data packet corresponding to a desired amount of postage value from which postage indicia to form an IBI may be generated and printed.

The foregoing request for VBI according to the illustrated embodiment includes value reservation data. For example, client system 120 may include data regarding a total amount of value needed to complete the desired session, as is available from operation at box 201, in a REQUEST_ISSUE communication to server system 110. Accordingly, a request for VBI according to embodiments of the invention additionally comprises a request for value reservation.

Additional or alternative data may be included in the request for VBI according to embodiments of the invention. For example, as will be better understood from the discussion which follows, client system 120 may additionally include value reservation identification, such as in the form of a "cookie" or other parcel of information, in the request for VBI. Where there is no existing value reservation in association with the session, as here, such a value reservation identification may be omitted or included as a null data set.

The aforementioned REQUEST_ISSUE communication represents a communication typically transmitted from a client system to a server system for issuing a postage indicia. By including reservation data, value reservation identification, and/or other data of the present invention in this communication, such an embodiment does not introduce additional transactions into a normal VBI request flow. Such embodiments minimize the impact on communication bandwidth and/or server load. Of course, embodiments of the present invention may communicate any or all such data by one or more separate transaction, if desired.

It should be appreciated that requests for value reservation made according to embodiments of the invention may be made automatically and/or manually. For example, where a user begins a session for generating multiple VBI, such as where the user is processing a batch of mail for application of information based indicia (IBI) using client system 120, a request for value reservation is preferably automatically made (i.e., without an express request for reservation by the user) in the initial VBI request for that session. As another example, where a user intends to generate one or more VBI at a later time, but wishes to ensure that sufficient value is available to the user for the generation of the VBI, the user may manually (i.e., by making an express request for reservation of value) make a request for value reservation, likely in a transaction separate from a request for VBI.

At box 204, a determination is made as to whether sufficient value is available for completing the desired session is made. For example, server system 110 may compare the total amount of value needed to complete the desired session, as may be included in the request for VBI, to the value remaining unreserved (taking into account all other active reservations) in the account the user is authorized to access. Such embodiments avoid a situation where a session is begun which cannot be completed due to insufficient value.

It should be appreciated that the illustrated embodiment includes a determination with respect to sufficient value being available at both box 202 and box 204. Such multiple determinations may be preferred in embodiments wherein accurate, up-to-date information is not available or always available at the client system. For example, in order to minimize the use of communication bandwidth and/or server load, embodiments of the invention may operate to make a determination with respect to sufficient value being available at the client system, prior to communicating a request for VBI (e.g., box 202), even where such a determination does not ensure that there currently is sufficient value available. Thereafter, the determination with respect to sufficient value being available may again be made after communicating a request for VBI (e.g., box 204), such as by the server system where more accurate, up-to-date information is available. Embodiments of the invention may operate to make a single determination with respect to sufficient value being available, if desired. For example, where communication bandwidth and/or server load is not an issue, the determination of box 202 may be omitted according to embodiments of the invention. Likewise, where sufficiently accurate, up-do-date information is available at the client system (e.g., where the server system pushes and/or the client system pulls updated value balance and reservation data in a timely fashion), the determination of box 204 may be omitted according to embodiments of the invention.

If the foregoing determination (box 204) is that sufficient value is not available, processing according to the illustrated embodiment proceeds to box 205 wherein insufficient value processing is performed. As discussed above, insufficient value processing according to embodiments of the invention may provide various operation, including termination of the session initiation attempt, reporting to the user that insufficient value is available to complete the session, operating to invoke additional processes (e.g., an account value refill operation), presenting the user with an option to continue the session as a partial session (e.g., the user is given the option to initiate the session such that only the number of VBI are generated that are possible using the value available in the account the user has accessed), etc. Upon completion of such additional processing, embodiments of the present invention may return to processing according to the illustrated flow diagram, such as to return to the determination of box 204 after an account value refill operation or to return proceed to box 206 where a user elects to continue the session as a partial session.

If it is determined that sufficient value is available to complete the session (box 204), processing according to the illustrated embodiments proceeds to box 206. At box 206 of the illustrated embodiment a value reservation is processed with respect to the value account accessed by the user. For example, upon an initial request for VBI of a session, having determined that sufficient, unreserved value is present with respect to the account, server system. 110 may create a record showing that an amount of otherwise available account value is reserved for the session being initiated by client system 120. Thereafter, this value amount is available for use in completing transactions of the session initiated by client system 120 (assuming the value reservation is not otherwise released, whether through timeout or explicit cancellation). Accordingly, if another user attempts to initiate a session (box 203), such as by using client system 130, which requires value from the account accessed by the user of client system 120 in excess of the value remaining unreserved in the account after the foregoing reservation is made, that user's session will attempt will proceed to insufficient value processing (box 205). However, the session associated with client system 120 proceeds to completion without fear of failure due to insufficient value being available.

In establishing a value reservation according to embodiments of the invention, additional information may be generated and/or assigned. For example, value reservation identification may be generated and/or assigned to uniquely (at least with respect to any currently active value reservations) identify the particular value reservation. Such value reservation identification may be provided in a cookie or other parcel of information provided to the client system in order for subsequent requests for VBI in the session to be properly associated with the appropriate value reservation. Additionally or alternatively, a timer for use with the value reservation may be generated or assigned to avoid a value reservation from rendering an amount of value unavailable in perpetuity, such as where a client system and/or server system fails to complete a session (e.g., looses the communication link, is powered down, suffers a catastrophic failure, etc.). For example, a timer (e.g., a timer counting down from in the range of 1-2 minutes) may be established such that if no further transactions with respect to the value reservation are received and/or acted upon by server system 110, the value reservation will be released (i.e., the value reservation "times out").

The foregoing timer is able to accommodate processing and communication delays typical to the serial generation of VBI, such as postage indicia, while preventing value from being unnecessarily reserved in the event of a failure. Should a temporary anomaly arise in which the timer causes release of the value reservation, but the session otherwise continues after value reservation timeout, embodiments of the present invention operate to reestablish the value reservation (assuming sufficient value remains available) when processing of value reservations (box 204) receives value reservation identification which is not associated with any current, unreleased, incomplete value reservation.

Referring still to processing of value reservations as provided by box 204, embodiments of the present invention operate to determine if a request for VBI is an initial request for VBI (i.e., is not associated with a previously established value reservation) through the use of a null value reservation identifier. For example, where a cookie having value reservation identification is utilized to identify a particular value reservation associated with VBI requests, a null value reservation identification therein may be utilized to indicate the request for VBI is an initial request of a session. According to a preferred embodiment, server system 110 uses data regarding a total amount of value needed to complete the desired session included in the request for VBI to establish an amount of the value reservation.

At box 207, a requested VBI is generated. For example, server system 110 may operate to generate an appropriate VBI meeting the needs of the request for VBI, preferably also deducting a value of the VBI from the value account accessed by the user. As mentioned above, the VBI generated may comprise a complete VBI or may comprise data (e.g., a token of value) from which a VBI may be generated. Keeping with the postage indicia example, the VBI generated may comprise a digitally signed data packet corresponding to a desired amount of postage value from which postage indicia to form an IBI may be generated and printed by a client system.

At box 208, an amount of value of the VBI generated is deducted from the value reservation. For example, server system 110 may operate to reduce the value reservation associated with the account accessed by the user of client system 120 by the amount of the VBI generated. Such an embodiment, operating to reduce the value reservation after generation of the VBI, ensures that sufficient value will be reserved for the generation of the VBI. It should be appreciated that, where deduction of the amount of value of the VBI generated results in zero value reservation, the value reservation is preferably terminated or otherwise ended.

In an embodiment wherein client system information with respect to account value balance, value reservation amounts, and/or the value remaining unreserved in the account are maintained accurately and up-to-date at the client systems, information with respect to the foregoing may be pushed to the client systems by the server system in a timely manner. For example, at box 207 an updated account value balance may be pushed to appropriate ones of the user systems. Similarly, at box 208, an updated value reservation amount and/or value remaining unreserved in the account may be pushed to appropriate ones of the user systems. Embodiments of the invention may additionally or alternatively allow users and/or their client systems to query or pull this information from the server system as desired.

At box 209, the generated VBI is provided in response to the request for VBI. For example, server system 110 may include the generated VBI in a ISSUE_VBI_RESPONSE communication to client system 120. Continuing with the foregoing postage indicia example, client system 120 may utilize the generated VBI to print a postage indicia comprising an IBI.

Additional or alternative data may be included in response to the request for VBI according to embodiments of the invention. For example, server system 110 may additionally include value reservation identification, such as in the form of a cookie or other parcel of information, in the response to the request for VBI.

The aforementioned ISSUE_VBI_RESPONSE communication represents a communication typically transmitted from a server system to a client system for issuing a postage indicia. By including value reservation identification and/or other data of the present invention in this communication, such an embodiment does not introduce additional transactions into a normal VBI request flow. Such embodiments minimize the impact on communication bandwidth and/or server load. Of course, embodiments of the present invention may communicate any or all such data by one or more separate transaction, if desired.

At box 210, a determination is made as to whether the current session is to include any additional VBI. For example, client system 120 may determine if any VBI remain to be generated and, if so, additional requests for VBI may be made from client system 120 to server system 110. Accordingly, if it is determined that the current session is to include additional VBI, processing according to the illustrated embodiment returns to box 203, wherein an additional request for VBI is made.

Embodiments of the present invention operate to include value reservation data for the amount of value needed to complete the remainder of the session in subsequent requests for VBI of a session. Although server system 110 of embodiments of the invention is capable of determining the amount of value needed to complete the remainder of the session, including such information in subsequent requests for VBI may be desired in order to present a consistent request for VBI format with respect to all requests of a session, to confirm proper operation of the system, to ensure that an appropriate value reservation is subsequently used, to facilitate adjustment in the value reservation during the session, etc.

Additionally, embodiments of the invention include value reservation identification in subsequent requests for VBI of a session. For example, as discussed above, client system 120 may return value reservation identification, such as in the form of a cookie or other parcel of information, to server system 110 in the subsequent requests for VBI of a session. Accordingly, subsequent requests for VBI may be associated with an appropriate value reservation for operation as described above.

If it is determined that the current session is not to include additional VBI (box 210), processing according to the illustrated embodiment returns to box 211. At box 211 of the illustrated embodiment, processing with respect to the session is concluded. Concluding a session according to embodiments of the invention may comprise printing or otherwise utilizing one or more of the VBI. For example, where requested VBI are used to generate postage indicia, the postage indicia may be printed. Of course, where such postage indicia is generated and printed between each request for VBI, printing of postage indicia upon conclusion of the session may comprise printing the final postage indicia.

Where a session concludes without the value of requested VBI equaling the value reservation (e.g., the final request for VBI does not result in the value reservation being zeroed), concluding the session may comprise a transaction to release or otherwise terminate the value reservation. For example, client system 120 may provide a communication to server 110 including value reservation identification without a request for VBI, thereby signaling that the value reservation is to be released. Such a communication may additionally or alternatively be used to release a value reservation at times other than when a session is concluded. For example, where a user aborts a session, such as due to the user detecting an error with respect to the session, an equipment failure affecting the session (e.g., a printer failure preventing VBI from printing properly), etc., the user may cause client system 120 to provide a communication to server 110 including value reservation identification without a request for VBI, thereby signaling that the value reservation is to be released. Such embodiments, introducing additional transactions in an other than normal VBI session flow, are not expected to substantially impact communication bandwidth and server load because these communications are not expected to be utilized in significant numbers.

Although the flow diagram of FIG. 2 has been described primarily with reference to situations in which multiple VBI are to be generated in a session and/or value reservation is made automatically to facilitate completion of session being initiated without failure due to insufficient value, the representative flow diagram supports operation with respect to various other situations. For example, a user may wish to ensure that a session to generate one or more VBI may be completed at a later time. Accordingly, the user may manually request a value reservation.

Accordingly, at box 201 the user may compile information such as the amount of value desired, an approximate time at which the session is to be conducted, information with respect to the user and/or session (such as for priority processing as discussed below), etc. Thereafter, a determination may be made at boxes 202 and/or 203 as to whether sufficient value is available and a value reservation request may be made at box 203. Because the value reservation is being made with respect to a session to be conducted at a time in the future, the value reservation request made at box 203 preferably does not include a request for VBI (or the data regarding the request for VBI is null). At box 206 processing is provided with respect to the value reservation, as described above. Because no request for VBI was included in the value reservation request, processing according to the illustrated embodiment passes through boxes 207 and 208 without generating a VBI or deducting the value of a VBI from the value reservation. However, at box 209 reservation identification is preferably provided by the server system to the client system as described above, without an associated VBI. At box 210, because the value reservation is associated with a future session, it is determined that additional VBI are to be requested. However, because the session is a future session, processing with respect to the session is preferably suspended. Accordingly, when the user returns to the client system to later conduct the session, the session may be selected through a user interface and/or the value reservation identification provided and processing according to embodiments proceeds to box 203 for operation as described above.

Embodiments of the invention provide various reservation priority levels, such as to individual users, user groups, user systems, sessions, types of sessions, jobs, etc., in order to facilitate completion of various desired operations without failure due to insufficient value. These priority levels may be utilized with respect to various value reservations, such as to cancel or override lower priority value reservations for subsequent sessions. Various users, user systems, sessions, types of sessions, jobs, etc. may be prevented from making value reservations according to embodiments of the invention. For example, particular users may be prevented from making reservations with respect to future sessions, although sessions being currently initiated by such users may be provided with value reservations. Similarly, particular types of sessions or jobs may be prevented from having value reservations made in association therewith.

In accordance with the foregoing, determinations with respect to sufficient value being available (boxes 202 and 204) may be made with respect to reservation priority levels. For example, where a lower priority user has a value reservation pending, a higher priority user's value reservation request may be granted, although the value remaining unreserved in the account the user is authorized to access is less than the total amount of value needed to complete the desired session, by canceling the lower priority user's value reservation. Embodiments of the invention preferably do not cancel or override a value reservation after a session has proceeded to the point of generating VBI, thereby ensuring that the session, once begun, does not fail for insufficient value. For example, if the lower priority user's session has not begun (e.g., the value reservation is associated with a future session or the value reservation has just been made and processing has not proceeded to generation of the VBI), the value reservation may be subject to cancellation. However, if the lower priority user's session has generated a VBI of a session wherein a plurality of VBI are to be generated, embodiments of the present invention allow that reservation to remain active irrespective of the higher priority user's request for value reservation. Of course, embodiments of the invention may operate to cancel or override lower priority value reservations, even once the session has begun, if desired.

In the foregoing example of a value reservation request being made for a later session, embodiments of the invention may adjust one or more operating parameters in accordance with such subsequent session operation. For example, a timeout timer initial value may be set with respect to the value reservation so as to accommodate some flexibility with respect to the projected session start time. As but one example, the timer may be set to establish a value reservation timeout some period of time (e.g., 1 hour) after the projected session start time. Thereafter, once the session has begun requesting VBI, the timer may be reset in accordance with the timeout parameters discussed above. Alternatively, embodiments of the invention may omit the use of such a timeout timer with respect to some or all sessions, relying instead upon the aforementioned communications to release value reservations.

Additionally or alternatively, embodiments of the present invention provide processing of value reservations in accordance with reservation priority levels. For example, where multiple users substantially simultaneously initiate sessions wherein all requests for value reservation cannot be accommodated, embodiments of the present invention give preference to the requests associated with higher priority levels. Accordingly, a request to initiate a session arriving at a server system after another request to initiate a session may be provided value reservation, and thus allowed to complete the session, over the earlier arriving user's request.

It should be appreciated from the above that embodiments of the present invention, or portions thereof, may be embodied in program or code segments operable upon a processor-based system (e.g., computer systems) for performing functions and operation as described herein. The program or code segments making up the various embodiments of the present invention may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining if sufficient value is available in an account to complete a value bearing indicia processing session;
   if said sufficient value is available, reserving a predetermined amount of value with respect to said account to facilitate completing said value bearing indicia processing session, wherein said reserving said predetermined amount of value prevents said predetermined amount of value from being utilized with respect to any other value bearing indicia processing session until the value reservation is released, wherein said reserving said predetermined amount of value comprises:
      associating said predetermined amount of value with said account as a value reservation,
      assigning a value reservation identification to said value reservation, and preventing transactions with respect to said account not bearing said value reservation identification from debiting said account below a balance corresponding to said value reservation;
   requesting an amount of value for a value bearing indicia from said account, said request including said value reservation identification, wherein said request further includes a revised predetermined amount of value with respect to said account;
   updating said value reservation using said revised predetermined amount of value; and
   if said sufficient value is not available, providing insufficient value processing with respect to said value bearing indicia processing session.

2. The method of claim 1, wherein said value bearing indicia processing session comprises a postage indicia generation session.

3. The method of claim 1, wherein said value bearing indicia processing session generates a plurality of value bearing indicia.

4. The method of claim 1, wherein said determining if sufficient value is available comprises:
   determining a balance with respect to said account;
   determining a total amount of reserved value with respect to said account; and
   comparing an amount of value for completing said value bearing indicia to the difference of the account balance and the total amount of reserved value.

5. The method of claim 1, further comprising:
   deducting said amount of value for said value bearing indicia from said value reservation.

6. The method of claim 1, wherein said reserving said predetermined amount of value comprises:
   assigning a timeout time period to the value reservation; and
   releasing said value reservation if a delay between transactions of said value bearing indicia processing session exceeds said timeout time period.

7. The method of claim 1, wherein said insufficient value processing comprises:
   preventing value bearing indicia processing with respect to said value bearing indicia processing session.

8. A method comprising:
   determining if sufficient value is available in an account to complete a value bearing indicia processing session;
   if said sufficient value is available, reserving a predetermined amount of value with respect to said account to facilitate completing said value bearing indicia processing session, wherein said reserving said predetermined amount of value prevents said predetermined amount of value from being utilized with respect to any other value bearing indicia processing session until the value reservation is released; and
   if said sufficient value is not available, providing insufficient value processing with respect to said value bearing indicia processing session, wherein said insufficient value processing comprises:
   allowing partial operation with respect to said value bearing indicia processing so as to provide value bearing indicia processing not to exceed said value available in said account; and
   reserving an amount of value corresponding to said partial operation to facilitate completing said partial operation with respect to said value bearing indicia processing.

9. A method comprising:
   establishing hierarchical priority levels for use with respect to value bearing indicia processing sessions;
   determining if sufficient value is available in an account to complete a value bearing indicia processing session;
   if said sufficient value is available, reserving a predetermined amount of value with respect to said account to facilitate completing said value bearing indicia processing session, wherein said reserving said predetermined amount of value prevents said predetermined amount of value from being utilized with respect to any other value bearing indicia processing session until the value reservation is released;

prior to said reserving said predetermined amount of value, determining if a priority level associated with said value bearing indicia processing session allows said reserving said predetermined amount of value in light of current value reservations made with respect to said account; and if said sufficient value is not available, providing insufficient value processing with respect to said value bearing indicia processing session.

10. A method comprising:

establishing a value reservation with respect to a multi-user postage metering system account balance, an amount of said value reservation corresponding to a total amount of postage for a postage generation session;

assigning value reservation identification to said value reservation;

providing said value reservation identification to a system controlling said postage generation session;

preventing transactions with respect to said account not associated with said postage generation session from debiting said account balance below a balance corresponding to said value reservation while said value reservation is active; and monitoring transactions with respect to said account for association with said value reservation identification, wherein said preventing said transactions from debiting said account is performed as a function of said monitoring, wherein transactions associated with said postage generation session include an updated amount for said value reservation included therein.

11. The method of claim 10, wherein said value reservation identification is included in a cookie included in a communication of an appropriate one of said transactions.

12. The method of claim 10, further comprising:

prior to establishing said value reservation, determining if sufficient value is available with respect to said account balance to complete said postage generation session.

13. The method of claim 12, wherein said determining if sufficient value is available comprises:

determining a total amount of reserved value with respect to said account balance; and comparing an amount of value for completing said postage generation session to the difference of said account balance and said total amount of reserved value.

14. The method of claim 10, further comprising:

establishing a timeout timer with respect to said value reservation, wherein said value reservation is released if said timeout timer expires.

15. The method of claim 14, further comprising:

resetting said timeout timer when a transaction of said postage generation session is processed, wherein said timeout timer expires if a delay between transactions of said postage generation session exceeds a time period of said timeout timer.

16. The method of claim 10, wherein said establishing a value reservation is accomplished without introducing additional transactions into a normal value based indicia acquisition session flow.

17. A system comprising:

a multi-user value bearing indicia metering system, wherein at least one account balance is controlled by said value bearing indicia metering system, said value bearing indicia metering system including a computer readable medium storing computer executable code thereon, said computer executable code including code for establishing a value reservation with respect to said account balance, said value reservation operable to reserve a predetermined amount of value with respect to said account to facilitate completing a value bearing indicia processing session, wherein said computer executable code further includes code for allowing partial operation with respect to said value bearing indicia processing session so as to provide value bearing indicia processing not to exceed said value available in said account and for reserving an amount of value corresponding to said partial operation to facilitate completing said partial operation with respect to said value bearing indicia processing session.

18. The system of claim 17, wherein said value bearing indicia metering system comprises:

a network based postage metering server.

19. The system of claim 18, wherein multiple postal clients are operable to access said at least one account substantially simultaneously, said computer executable code further including code for determining a postal client of said multiple postal clients associated with said value reservation and allowing said postal client to deduct value from said at least one account balance.

20. The system of claim 17, wherein said computer executable code further includes:

code for preventing said predetermined amount of value from being utilized with respect to any other value bearing indicia processing session until said value reservation is released.

21. A method comprising:

establishing a value reservation with respect to a multi-user postage metering system account balance, an amount of said value reservation corresponding to a total amount of postage for a postage generation session;

preventing transactions with respect to said account not associated with said postage generation session from debiting said account balance below a balance corresponding to said value reservation while said value reservation is active, wherein said preventing transactions with respect to said account not associated with said postage generation session from debiting said account balance below a balance corresponding to said value reservation while said value reservation is active comprises:

allowing partial operation with respect to said postage generation session so as to provide value bearing indicia processing not to exceed a value available in said account; and reserving an amount of value corresponding to said partial operation to facilitate completing said partial operation with respect to said postage generation session.

22. A method comprising:

establishing hierarchical priority levels for use with respect to postage generation sessions;

establishing a value reservation with respect to a multi-user postage metering system account balance, an amount of said value reservation corresponding to a total amount of postage for a postage generation session;

prior to said establishing said value reservation, determining if a priority level associated said postage generation session allows said reserving said amount in light of current value reservations made with respect to said account; and preventing transactions with respect to said account not associated with said postage generation session from debiting said account balance below a balance corresponding to said value reservation while said value reservation is active.

23. A system comprising:
a multi-user value bearing indicia metering system, wherein at least one account balance is controlled by said value bearing indicia metering system, said value bearing indicia metering system including a computer readable medium storing computer executable code thereon, said computer executable code including code for establishing a value reservation with respect to said account balance, said value reservation operable to reserve a predetermined amount of value with respect to said account to facilitate completing a value bearing indicia processing session, wherein said computer executable code further includes code for:
establishing hierarchical priority levels for use with respect to value bearing indicia processing sessions; and
prior to said reserving said value reservation, determining if a priority level associated said value bearing indicia processing session allows said reserving said value reservation in light of current value reservations made with respect to said account.

* * * * *